United States Patent
Wallach

(10) Patent No.: US 11,907,158 B2
(45) Date of Patent: Feb. 20, 2024

(54) VECTOR PROCESSOR WITH VECTOR FIRST AND MULTIPLE LANE CONFIGURATION

(71) Applicant: Micron Technology, Inc., Boise, ID (US)

(72) Inventor: Steven Jeffrey Wallach, Dallas, TX (US)

(73) Assignee: Micron Technology, Inc., Boise, ID (US)

(*) Notice: Subject to any disclaimer, the term of this patent is extended or adjusted under 35 U.S.C. 154(b) by 89 days.

(21) Appl. No.: 17/135,465

(22) Filed: Dec. 28, 2020

(65) Prior Publication Data

US 2021/0117375 A1  Apr. 22, 2021

Related U.S. Application Data

(63) Continuation of application No. 16/356,146, filed on Mar. 18, 2019, now Pat. No. 10,877,925.

(51) Int. Cl.
| | | |
|---|---|---|
| G06F 15/80 | (2006.01) | |
| G06F 7/57 | (2006.01) | |
| G06F 9/30 | (2018.01) | |
| G06F 9/345 | (2018.01) | |
| G06F 9/38 | (2018.01) | |

(52) U.S. Cl.
CPC ............ *G06F 15/8076* (2013.01); *G06F 7/57* (2013.01); *G06F 9/30101* (2013.01)

(58) Field of Classification Search
CPC ...... G06F 9/345; G06F 9/3016; G06F 9/3887; G06F 9/30036; G06F 9/3824; G06F 7/57; G06F 15/8076; G06F 9/30101

USPC ............................................................ 712/4
See application file for complete search history.

(56) References Cited

U.S. PATENT DOCUMENTS

| | | | |
|---|---|---|---|
| 6,006,315 A | 12/1999 | Park | |
| 6,009,505 A | 12/1999 | Thayer et al. | |
| 6,088,783 A | 7/2000 | Morton | |
| 6,446,193 B1* | 9/2002 | Alidina | G06F 9/3885 |
| | | | 712/7 |
| 7,036,001 B2 | 4/2006 | Barlow et al. | |
| 10,877,925 B2 | 12/2020 | Wallach | |
| 2005/0097299 A1 | 5/2005 | Dockser | |
| 2005/0102487 A1* | 5/2005 | Chatterjee | G06F 9/3013 |
| | | | 712/E9.046 |
| 2006/0136700 A1 | 6/2006 | Barlow et al. | |

(Continued)

FOREIGN PATENT DOCUMENTS

KR  20180063542 A  6/2018

OTHER PUBLICATIONS

Www.sciencedirect.com/topics/computer-science/single-instruction-multiple-data (Year: 2020).*

(Continued)

*Primary Examiner* — Chun Kuan Lee
(74) *Attorney, Agent, or Firm* — Greenberg Traurig

(57) ABSTRACT

A vector processor with a vector first and multi-lane configuration. A vector operation for a vector processor can include a single vector or multiple vectors as input. Multiple lanes for the input can be used to accelerate the operation in parallel. And, a vector first configuration can enhance the multiple lanes by reducing the number of elements accessed in the lanes to perform the operation in parallel.

20 Claims, 6 Drawing Sheets

(56) References Cited

U.S. PATENT DOCUMENTS

| | | |
|---|---|---|
| 2008/0114970 A1 | 5/2008 | Colavin |
| 2009/0049113 A1 | 2/2009 | Muff et al. |
| 2013/0212354 A1* | 8/2013 | Mimar ............... G06F 9/30021 |
| | | 712/E9.023 |
| 2013/0219149 A1 | 8/2013 | Ellis et al. |
| 2017/0083323 A1 | 3/2017 | Howes |
| 2017/0177359 A1 | 6/2017 | Ould-Ahmed-Vall |
| 2018/0113712 A1 | 4/2018 | Sperber et al. |
| 2019/0129718 A1* | 5/2019 | Chen ......................... G06F 7/57 |
| 2019/0213009 A1* | 7/2019 | Burgess ............. G06F 9/30003 |
| 2020/0272478 A1 | 8/2020 | Kwon et al. |
| 2020/0301875 A1 | 9/2020 | Wallach |

OTHER PUBLICATIONS

En.wikipedia.org/w/index.php?title=Single_instruction,_multiple_data&oldid=884765402 (Year: 2019).*

Vector Processor With Vector First and Multiple Lane Configuration, U.S. Appl. No. 16/356,146, filed Mar. 18, 2019, Steven Wallach.

International Search Report and Written Opinion, PCT/US2020/020780, dated Jun. 24, 2020.

Extended European Search Report, EP20772810.6, dated Nov. 14, 2022.

* cited by examiner

VECTOR PROCESSOR WITH VECTOR FIRST AND MULTIPLE LANE CONFIGURATION

RELATED APPLICATIONS

The present application is a continuation application of U.S. patent application Ser. No. 16/356,146, filed Mar. 18, 2019 and issued as U.S. Pat. No. 10,877,925 on Dec. 29, 2020, and entitled "Vector Processor with Vector First and Multiple Lane Configuration," the entire disclosure of which application is hereby incorporated herein by reference.

TECHNICAL FIELD

In general, at least some embodiments disclosed herein relate to vector processors. Also, at least some embodiments disclosed herein relate to vector processors with multi-lane configurations and vector processors with vector first configurations.

BACKGROUND

A vector processor can be or include a central processing unit (CPU) that implements an instruction set containing instructions that operate on arrays of data of commonly referred to as vectors. This is different from a scalar processor, where instructions operate on single data items. Vector processors can greatly improve performance on certain workloads over scalar processor, notably numerical simulation and similar tasks. Vector processors appeared in the early 1970s and where a large part of supercomputing design through the 1970s into the 1990s. The rapid fall in the price-to-performance ratio of more conventional microprocessor designs, such as scalar processor designs, as led to less development and manufacturing of vector processors.

In general, conventional CPUs (e.g., scalar based CPUs) are able to manipulate a few pieces of data at a time, at most. For instance, such CPUs have an instruction that essentially provide adding A to B and store the result in C. The data for A, B and C is usually pointed to by passing in an address to a memory location that holds the data. Decoding this address and getting the data out of the memory takes some time, during which the CPU can sit idle waiting for the requested data to show up.

To reduce the amount of time consumed by these steps, more contemporary CPUs use a technique known as instruction pipelining in which the instructions pass through several sub-units in turn. The first sub-unit reads the address and decodes it, the next fetches the values at those addresses, and the next does the math itself. With pipelining, the CPU starts decoding the next instruction even before the first has left the CPU, similar to an assembly line. This way, the address decoder, and other mentioned parts are simultaneously and constantly in use. Because of the pipelining, any instruction takes the same amount of time to complete.

Vector processors improve on pipelining by, instead of pipelining merely the instructions, such processors also pipeline the data itself. Thus, instead of constantly having to decode instructions and then fetch the data needed to complete the instructions, the vector processor reads a single instruction from memory. This allows for reduced decoding time and reduced power consumption (e.g., one decode with vector processors instead of multiple decodes).

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
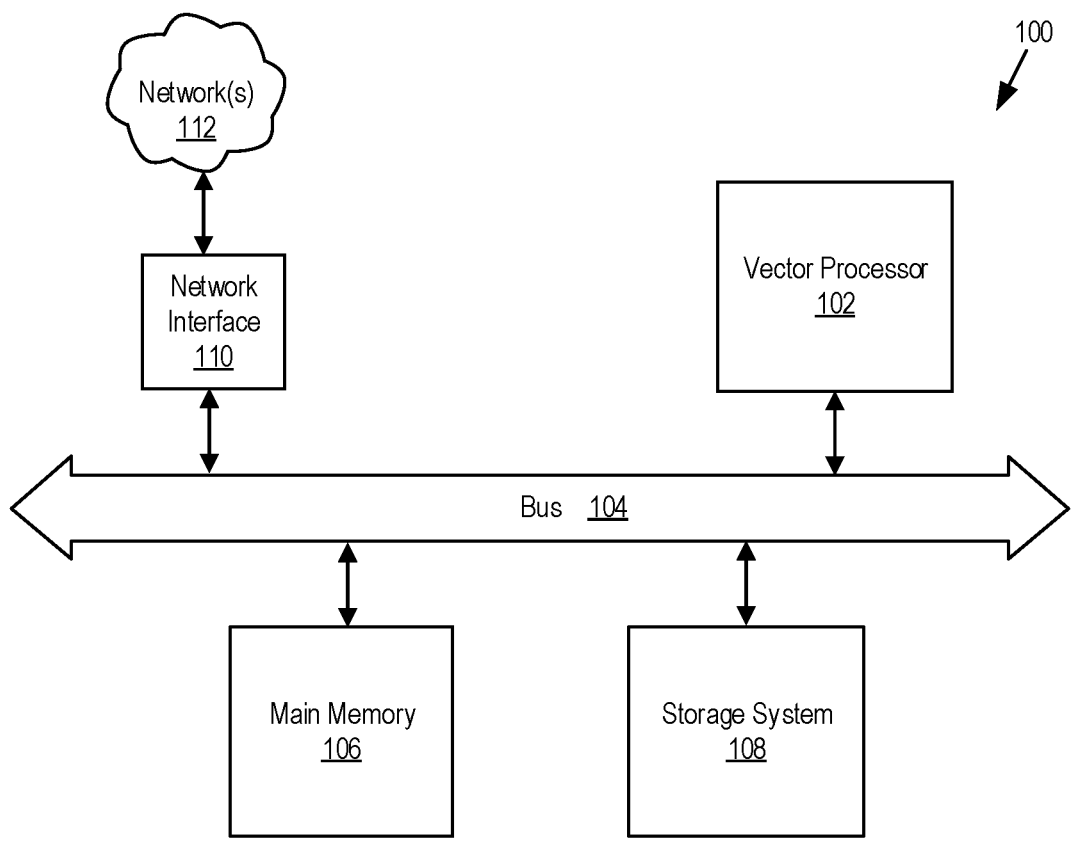
FIG. 1 illustrates example parts of an example computing device 100, in accordance with some embodiments of the present disclosure.

In general, at least some embodiments disclosed herein relate to vector processors. Also, at least some embodiments disclosed herein relate to vector processors with multi-lane configurations and vector processors with vector first configurations. The embodiments disclosed herein provide specific technical solutions to at least the technical problems mentioned in the background section and other parts of the application as well as other technical problems not described herein but recognized by those of skill in the art. At least some embodiments disclosed herein include a vector processor with a vector first and multi-lane configuration. A vector operation for a vector processor can include a single vector or multiple vectors as input. Multiple lanes for the input can be used to accelerate the operation in parallel. And, a vector first configuration can enhance the multiple lanes by reducing the number of elements accessed in the lanes to perform the operation in parallel. As mentioned, multiple lanes for the input can be used to accelerate the operation in parallel. For example, an operation may be the addition of vectors A and B, or element-wise multiplications vectors A and B, or any other type of operation on two or more vectors.

Each vector of an operation can be separated into multiple lanes (k lanes) that are operated on in parallel. For example, consider the multiplication of $A(i) \times B(i)$ ($i=0, 1, 2, \ldots, (n-1)*k$). This can be done in k parallel lanes: $A(m) \times B(m)$ ($m = k \times i + j$, and $i=0, 1, 2, \ldots, n-1$) for lane $j=0, 1, 2, \ldots, k-1$ in parallel. In general, the multiplication "X" can be replaced with another operation (e.g., addition, subtraction, bit-wise OR, etc.). The result of the operation on two or more vectors can be a scalar or a vector.

Also, as mentioned, a vector first configuration can enhance the multiple lanes by reducing the number of elements accessed in the lanes to perform the operation in parallel. At least some embodiments disclosed herein include components that can implement a vector first configuration with vector registers having multiple lanes, which can reduce the number of elements accessed in the lanes to perform operations in parallel more efficiently. For example, one of the components can be a vector first register. A vector first register can be used to indicate whether the first element used for the calculation involving a vector can be found. Without a vector first register, the calculation always starts with element 0 of the vector contained in the vector data register. And, if the calculation always starts with element 0 of the vector contained in the vector data register, then the entire operand must always be reloaded. But, with vector first processing, only a new operand needs to be loaded.

For example, consider a vector $A(i)$ ($i=0, 1, 2, \ldots, n-1$). If vector first register stores m, the elements used for the calculation are A(i) (i=m, m+1, . . . ). A problem occurs in the situation where the vector is separated into multiple lanes. If a total of k lanes is used, lane j has elements A(k×i+j) (i=0, 1, . . . ) of the vector A where j is 0, 1, k−1. To start the operation on element (k×a+b) where b is not zero, the problem is that the first element would not be in lane zero without the use of the vector first register. Instead, the first element would be in lane b, (e.g., and not lane zero). To start on element k×a+b, the elements to be used in lane j are A(k×i+j) (i=a+1, 1, . . . and j>b); and for j<=b, the elements to be used in lane j are A(k×i+j) (i=a, 1, . . . ). A multiplexor of the system can be configured to shift the content of the lanes towards lane zero according to b. The multiplexor can be replaced with a shifter that shifts the entire operand from one lane to another lane. The shifting and/or multiplexing can be configured so that the first element (k×a+b) is to be placed in lane zero. Specifically, A(k×i+j) of lane j is shifted to lane j−b (for i=a, 1, . . . , and j>=b) and to Lane k+j−b (for i=a+1, 1, . . . , and j<b). With this shift, the operations can start on input element a of lanes b to k−1, and on input element a+1 of lanes 0 to b−1. To start on element k×a+b, b controls the lane shift; and a/a+1 controls selection of the first element in the lanes. In a two-lane case, it can be simplified as a shift and/or switch based on whether k×a+b is odd or even. Examples of the system can be used with two lanes, four lanes, sixteen lanes, and any arrangement of lanes with a power of two. However, the hardware becomes exponentially more complex with the increase in lane number.

FIG. 1 illustrates example parts of an example computing device 100, in accordance with some embodiments of the present disclosure. The device 100 can be communicatively coupled to one or more networks 112, as shown. The device 100 includes a vector processor 102 that is in accordance with some embodiments of the present disclosure. The device 100 also includes at least a bus 104, a main memory 106, a data storage system 108, and a network interface 110. The bus 104 communicatively couples the vector processor 102, the main memory 106, the data storage system 108, and the network interface 110. The device 100 includes a computer system that includes at least vector processor 102, main memory 106 (e.g., read-only memory (ROM), flash memory, dynamic random access memory (DRAM) such as synchronous DRAM (SDRAM) or Rambus DRAM (RDRAM), static random access memory (SRAM), etc.), and data storage system 108, which communicate with each other via bus 104 (which can include multiple buses).

To put it another way, FIG. 1 is a block diagram of an example device 100 having a computer system in which embodiments of the present disclosure can operate. In some embodiments, the computer system can include a set of instructions, for causing a machine to perform any one or more of the methodologies discussed herein, when executed. In such embodiments, the machine can be connected (e.g., networked via network interface 110) to other machines in a LAN, an intranet, an extranet, and/or the Internet (e.g., network(s) 112). The machine can operate in the capacity of a server or a client machine in client-server network environment, as a peer machine in a peer-to-peer (or distributed) network environment (such as the peer-to-peer networks described herein), or as a server or a client machine in a cloud computing infrastructure or environment.

Vector processor 102 represents one or more vector processors that are in accordance with some embodiments of the present disclosure. The vector processor 102 can include a microprocessor, a central processing unit, or the like. More particularly, the vector processor 102 can include a complex instruction set computing (CISC) microprocessor, reduced instruction set computing (RISC) microprocessor, very long instruction word (VLIW) microprocessor, or a processor implementing other instruction sets, or processors implementing a combination of instruction sets, as long as the processor uses: vector instructions, vector registers, a vector first and multi-lane configuration. The vector processor 102 can also be one or more special-purpose processing devices such as an application specific integrated circuit (ASIC), a field programmable gate array (FPGA), a digital signal processor (DSP), graphics processing unit (GPU), network processor, or the like. The vector processor 102 can be configured to execute instructions for performing the operations and steps discussed herein. The vector processor 102 can further include a network interface device such as network interface 110 to communicate over one or more communications network (such as network(s) 112).

The data storage system 108 can include a machine-readable storage medium (also known as a computer-readable medium) on which is stored one or more sets of instructions or software and can embody at least some aspects of one or more of the methodologies or functions described herein. The data storage system 108 can include non-volatile storage. The instructions can also reside, completely or at least partially, within the main memory 106 and/or within the vector processor 102 during execution thereof by the computer system, the main memory 106 and the vector processor 102 also can constitute a machine-readable storage media. While the memory, vector processor, and data storage parts are shown in the example embodiment to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Figure 2:
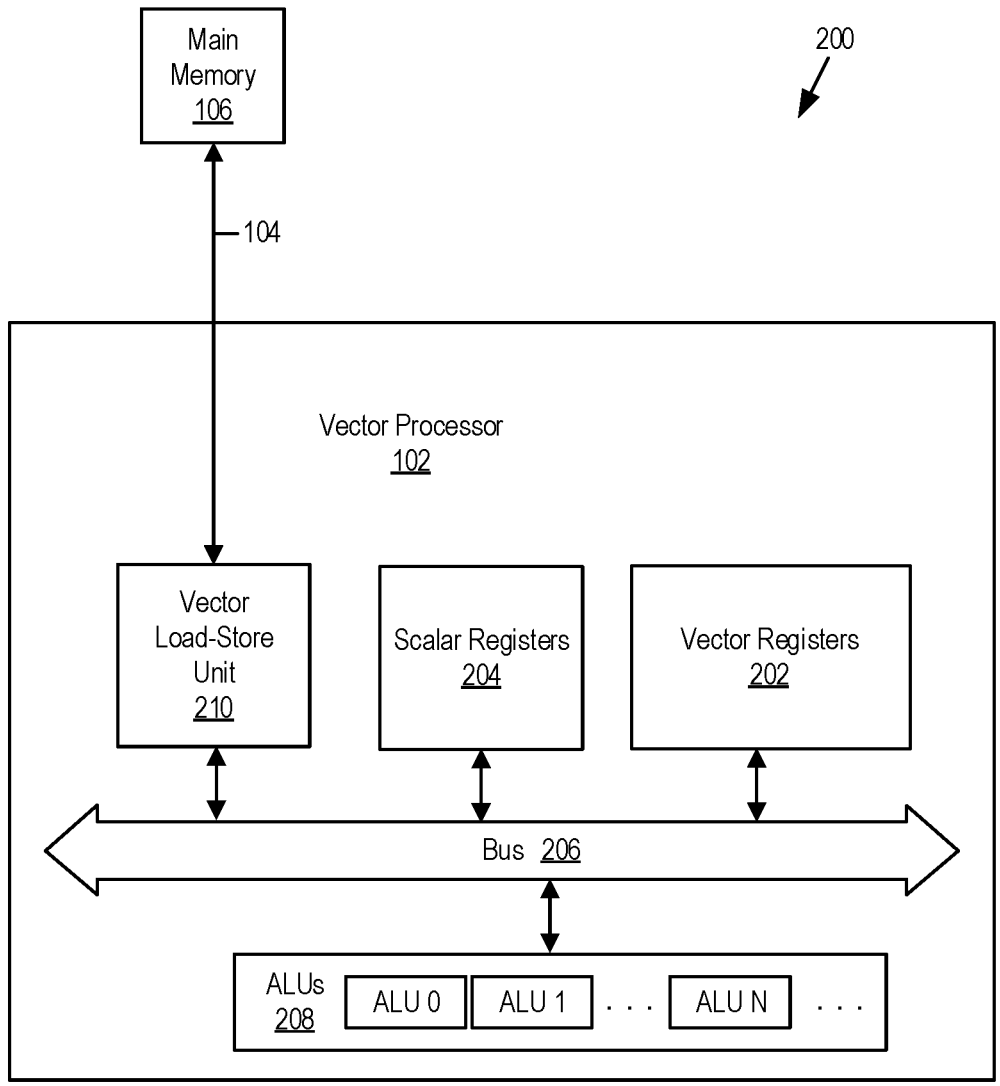
FIG. 2 illustrates example parts of an example computing device 200, in accordance with some embodiments of the present disclosure.

FIG. 2 illustrates example parts of an example computing device 200, in accordance with some embodiments of the present disclosure. As shown, computing device 200 includes vector processor 102 as well as bus 104 and main memory 106 (e.g., see FIG. 1). Computing device 200 can also be or include computing device 100.

As shown in FIG. 2, vector processor 102 includes vector registers 202, scalar registers 204, bus 206, arithmetic logic units 208 (ALUs 208), and vector load-store unit 210. Other embodiments of the computing device 200 can include the scalar registers 204 being external to the vector processor 102 or in a separate unit of the vector processor from a unit in the vector processor having the vector registers 202. The bus 206 communicatively couples vector registers 202, scalar registers 204, arithmetic logic units (ALUs) 208, and vector load-store unit 210, and such components can communicate with each other via bus 206 (which can include multiple buses). Vector registers 202 include multiple vector registers. And, ALUs 208 include multiple ALUs—e.g., arithmetic logic unit (ALU) 0, ALU 1, and ALU N.

Vector processor 102 includes a vector first and multi-lane configuration. Vector processor 102 can be or include one or more central processing units (CPUs) that implement instructions that operate on one-dimensional arrays of data called vectors. Vector registers 202 in the vector processor 102 can include vector registers with multiple lane configurations. Scalar registers 204 include scalar registers that can provide indexing and control values for vector first configurations of the vector registers having multiple lane configurations. Scalar registers can also provide numerical values used by the vector instructions. For example, a vector provided by a vector register can be multiplied by a scalar provided by a scalar register. Thus, at least some of the vector registers 202 can have a vector first and multi-lane configuration. Each of such registers can be connected to a respective ALU of the ALUs 208. An ALU of ALUs 208 can include a combinational digital electronic circuit that performs arithmetic and bitwise operations on integer binary numbers. In the vector processor 102, an ALU of the ALUs 208 can be connected to a vector register with the vector first and multi-lane configuration.

Also, the scalar registers 204 can include programable scalar registers. A programable scalar register can be used so that a vector provided by a vector register (e.g., one of the vector registers 202) can be operated on by a scalar provided by and programed into one of the programable scalar registers. For example, one of the operations can include a vector multiplied by a scalar value (e.g., vector A(i)×scalar p).

Vector load-store unit 210 includes circuitry for executing load and store instructions, generating addresses of load and store operations and loading data from memory or storing it back to memory from the registers of the vector processor 102. Vector load-store unit 210 can perform many of the operations described herein including operations of the method 400 of FIGS. 4-5.

A vector register of the registers 202 can include a vector first and multi-lane configuration. An example of the vector first and multi-lane configuration is explained below. Also, examples of the vector first and multi-lane configuration are explained in greater detail in FIGS. 3-6.

Each of the computing devices described herein can be a machine capable of executing a set of instructions (sequential or otherwise) that specify actions to be taken by that machine. Further, while a single machine is illustrated for each of the illustrated computing devices of FIGS. 1 and 2, the term "machine" shall also be taken to include any collection of machines that individually or jointly execute a set (or multiple sets) of instructions to perform any one or more of the methodologies or operations discussed herein. And, each of the illustrated computing devices can each include at least a bus and/or motherboard, one or more controllers (such as one or more CPUs), a main memory that can include temporary data storage, at least one type of network interface, a storage system that can include permanent data storage, and/or any combination thereof.

Figure 3:
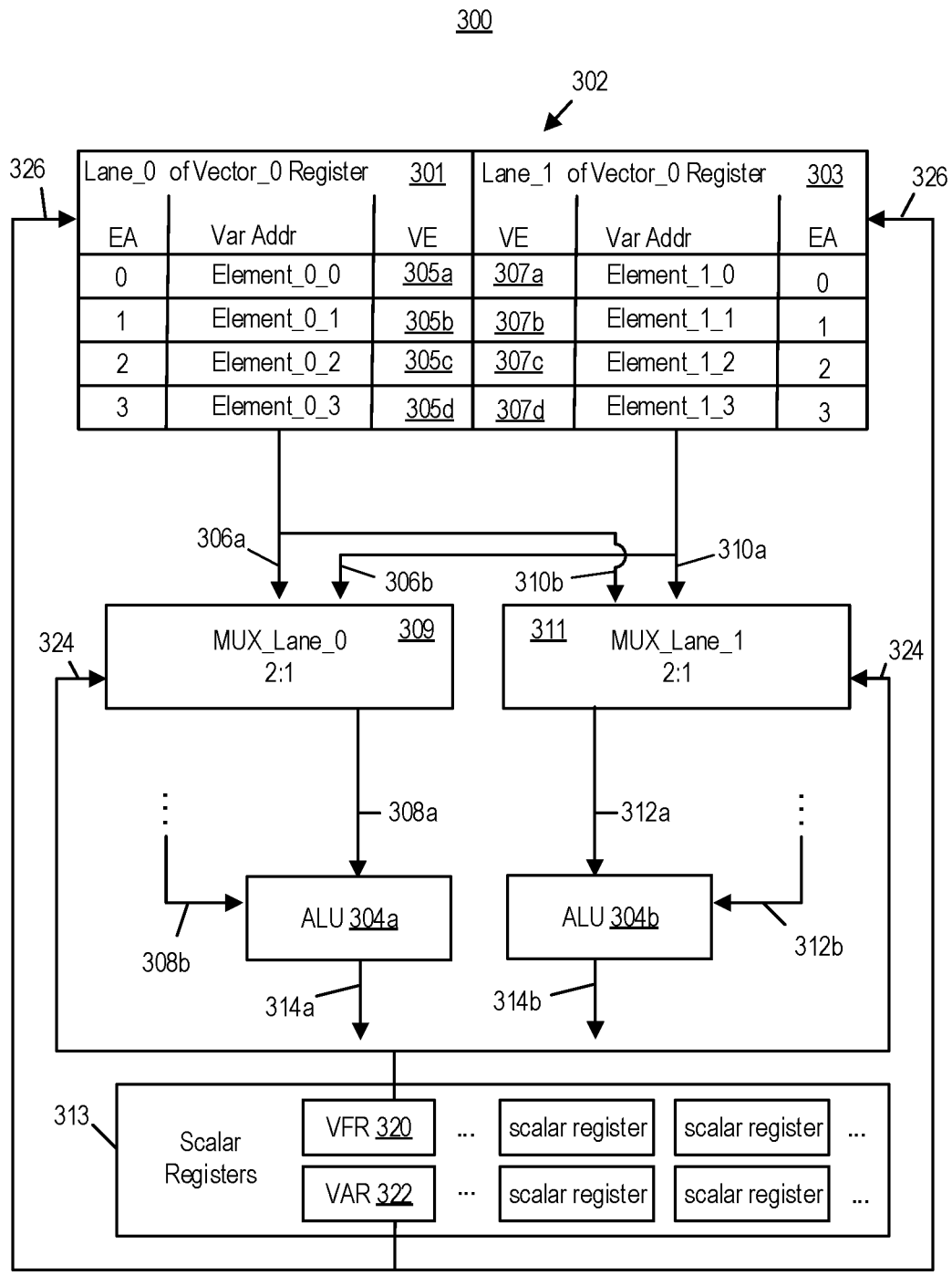
FIG. 3 illustrates an example vector first system 300 having two lanes, in accordance with some embodiments of the present disclosure.

FIG. 3 illustrates an example vector first system 300 having two lanes, in accordance with some embodiments of the present disclosure. The vector first system 300 can be a part of vector processor 102 (e.g., see FIG. 1 or 2). Vector first system 300 includes a plurality of lanes 302 of a first vector register that includes vector register lanes 301 and 303. To put it another way, the system 300 includes first vector register lane 301 and second vector register lane 303 for two lanes of a first vector register (e.g., one of vector registers 202). Although the system 300 shows components of a first vector register, the system interacts directly with components of a second vector register. The first and second vector registers each provide a respective input for ALU 304a and ALU 304b of system 300.

In general, multiple lanes for the input can be used to accelerate the operation of an in parallel. As shown the lanes each have respective ALUs (e.g., ALUs 304a and 304b). For example, an operation may be the addition of the first and second vectors (i.e., vectors A and B), or element-wise multiplications of the vectors, or any other type of operation on the two vectors. Each vector of an operation can be separated into multiple lanes (k lanes) that are operated on in parallel. For example, consider the multiplication of A(i)×B(i) (i=0, 1, 2, . . . , (n−1)*k). This can be done in k parallel lanes: A(m)×B(m) (m=k×i+j, and i=0, 1, 2, . . . , n−1) for lane j=0, 1, 2, . . . , k−1 in parallel. In general, the multiplication "X" can be replaced with another operation (e.g., addition, subtraction, bit-wise OR, etc.). The results from parallel processing with two lanes (e.g., outputs 314a and 314b) of the operations of parallel lane ALUs (e.g., ALUs 304a and 304b) on two or more vectors can be a scalar or a vector.

Also, in general, a vector first configuration can enhance the multiple lanes by reducing the number of elements accessed in the lanes to perform the operation in parallel. As shown in at least FIGS. 3-6, components of system 300 or 500 can implement a vector first configuration with vector registers having multiple lanes (i.e., a vector first and multi-lane configuration), which can reduce the number of elements accessed in the lanes to perform operations in parallel more efficiently. For example, one of the components can be a vector first register (e.g., a register storing VFR value 320 or 520). A vector first register can be used to indicate whether the first element used for the calculation involving a vector can be found. Without a vector first register, the calculation always starts with element 0 of the vector.

A vector first configuration can enhance the multiple lanes by reducing the number of elements accessed in the lanes to perform the operation in parallel. At least some embodiments disclosed herein include components that can implement a vector first configuration with vector registers having multiple lanes, which can reduce the number of elements accessed in the lanes to perform operations in parallel more efficiently. For example, one of the components can be a vector first register. A vector first register can be used to indicate whether the first element used for the calculation involving a vector can be found. Without a vector first register, the calculation always starts with element 0 of the vector contained in the vector data register. And, if the calculation always starts with element 0 of the vector contained in the vector data register, then the entire operand must always be reloaded. But, with vector first processing, only a new operand needs to be loaded.

For example, consider a vector A(i) (i=0, 1, 2, . . . , n−1). If vector first register stores m, the elements used for the calculation A(i) (i=m, m+1, . . . ). A problem occurs in the situation where the vector is separated into multiple lanes. If a total of k lanes is used, lane j has elements A(k×i+j) (i=0, 1, . . . ) of the vector A where j is 0, 1, . . . , k−1. To start the operation on element (k×a+b) where b is not zero, the problem is that the first element would not be in lane zero without the use of the vector first register. Instead, the first element would be in lane b. To start on element k×a+b, the elements to be used in lane j are A(k×i+j) (i=a+1, 1, . . . and j>b); and for j<=b, the elements to be used in lane j are A(k×i+j) (i=a, 1, . . . ).

Figure 6:
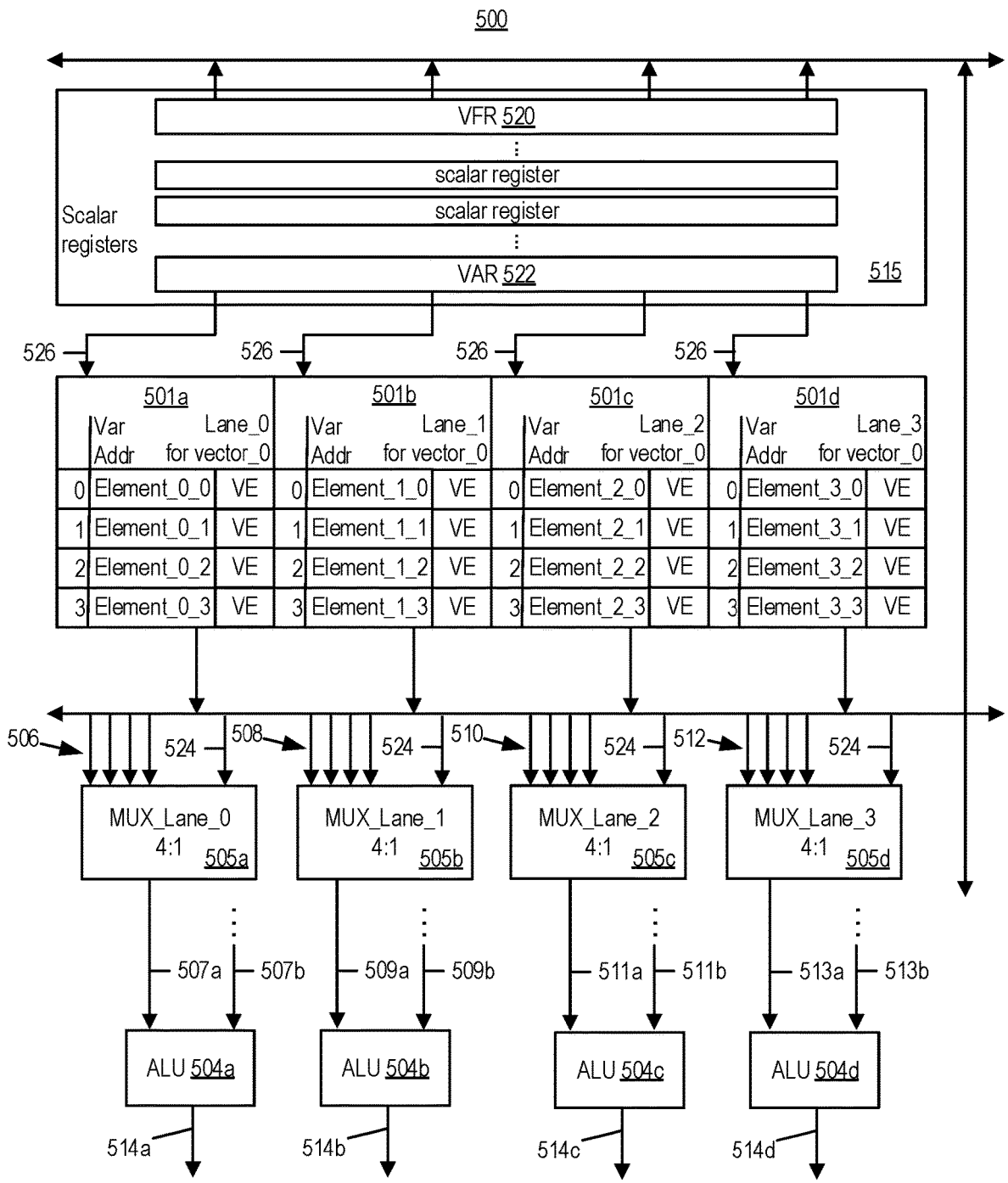
FIG. 6 illustrates an example vector first system 500 having four lanes, in accordance with some embodiments of the present disclosure.

One or more multiplexors (e.g., see multiplexors 309 and 311) of the system can be configured to shift the content of the lanes towards lane zero according to b. The multiplexor(s) can be replaced with one or more shifters. The shifting and/or multiplexing can be configured so that the first element (k×a+b) is to be placed in lane zero. Specifically, A(k×i+j) of lane j is shifted to lane j−b (for i=a, 1, . . . , and j>=b) and to Lane k+j−b (for i=a+1, 1, . . . , and j<b). With this shift, the operations can start on input element a of lanes b to k−1, and on input element a+1 of lanes 0 to b−1. To start on element k×a+b, b controls the lane shift; and a/a+1 controls selection of the first element in the lanes. In a two-lane case, it can be simplified as a shift and/or switch based on whether k×a+b is odd or even. Examples of the system can be used with two lanes, four lanes, sixteen lanes, and any arrangement of lanes with a power of two. However, the hardware becomes exponentially more complex with the increase in the number of lanes. A two-lane example arrangement of components is shown in FIG. 3. And, a four-lane example arrangement is shown in FIG. 6.

Referring to the two-lane example in FIG. 3, the first vector register lane 301 includes vector elements (VE) 305a, 305b, 305c, and 305d, and the second vector register lane 303 includes vector elements (VE) 307a, 307b, 307c, and 307d. Use of the elements of vector registers is described in more detail with respect to method 400 shown in FIGS. 4 and 5.

The system 300 also includes ALU 304a (ALU for Lane_0) and ALU 304b (ALU for Lane_1) for at least the first vector register and the second vector register. The ALUs 304a and 304b can be one of ALUs 208 and the first and second vector registers can be two of vector registers 202, in some embodiments. Parts of the second vector register are not shown except for its outputs which are lane inputs for the ALU—e.g., see 308b and 312b.

The ALU 304a is shown including a first lane input 308a for an output communicated from either the first vector register lane 301 or the second vector register lane 303 of the first vector register. The ALU 304a is also shown including a first lane input 308b for an output communicated from either the first vector register lane or the second vector register lane of the second vector register.

The ALU 304b is shown including a second lane input 312a for an output communicated from either the first vector register lane 301 or the second vector register lane 303 of the first vector register. The ALU 304b is also shown including a second lane input 312b for an output communicated from either the first vector register lane or the second vector register lane of the second vector register.

In some embodiments, an ALU of the system (e.g., ALU 304a or 304b) can include an ALU output that is based on at least one function of the ALU and inputs from the same lane outputs of the first and second vector registers. For example, ALU output 314a can be based on at least one function of the ALU 304a and the first lane inputs 308a and 308b of the first and second vector registers. And, ALU output 314b can be based on at least one function of the ALU 304b and the second lane inputs 312a and 312b of the first and second vector registers. The function(s) for each of ALUs 304a and 304b can be the same function(s) for each ALU.

The system 300 also includes a first 2:1 multiplexor 309 configured to receive, as inputs (e.g., inputs 306a and 306b), an output from the first vector register lane 301 and an output from second vector register lane 303. The first 2:1 multiplexor 309 can also be configured to receive, as a selection input (e.g., selection input 324), a vector first register value (e.g., VFR value 320). As shown, the selection input 324 for the first 2:1 multiplexor 309 is received from an output of a scalar register (e.g., a register for VFR value 320 in scalar registers 313 for the first vector register). The first scalar register can be one of the scalar registers of scalar registers 204 depicted in FIG. 2. The first 2:1 multiplexor 309 can also be configured to select either the output from the first vector register lane 301 or the output from second vector register lane 303 based on the selection input 324. The first 2:1 multiplexor 309 can also be configured to communicate the selected output to the first lane input 308a of the ALU 304a for the first register.

The system 300 also includes a second 2:1 multiplexor 311 configured to receive, as inputs (e.g., inputs 310a and 310b), the output from the first vector register lane 301 and the output from second vector register lane 303. The second 2:1 multiplexor 311 can also be configured to receive, as a selection input (e.g., selection input 324), a VFR value (e.g., VFR value 320). As shown, the selection input 324 for the second 2:1 multiplexor 311 is received from an output of a scalar register (e.g., a register for VFR value 320 in scalar registers 313). The scalar register can be one of the scalar registers of scalar registers 204 depicted in FIG. 2. The second 2:1 multiplexor 311 can also be configured to select either the output from the first vector register lane 301 or the output from second vector register lane 303 based on the selection input 324. The second 2:1 multiplexor 311 can also be configured to communicate the selected output to the second lane input 312a of the ALU 304b for the first register.

The scalar registers 313 can also include a VAR register that is configured to provide, by a respective index of the first vector register (e.g., VAR register 322), element address values (EA values) for first vector register lane 301 and the second vector register lane 303—e.g., see the values "0", "1", "2", and "3" under "EA" shown in the vector register lanes depicted in FIGS. 3 and 6 which provide access to corresponding elements when such values match input 326. In other words, inputs 326 can be consider inputs having or being related to EA values.

Also, the scalar registers 313 can include programable scalar registers. A programable scalar register can be used so that a vector provided by a vector register (e.g., a vector register having lanes 301 and 303) can be operated on by a scalar provided by and programed into one of the programable scalar registers. For example, one of the operations can include a vector multiplied by a scalar value (e.g., vector A(i)×scalar p).

The VFR values and the EA values can each be scalars stored in scalar registers such as registers in the scalar registers 204 shown in FIG. 2. The VFR value and the EA values are described in more detail with respect to method 400 depicted in FIGS. 4 and 5. The VFR values and the EA values can be used to determine initial addresses used to access the respective vector lanes (e.g., see full addresses "Element_0_0" and "Element_1_0" in vector elements 305a and 307a depicted in FIG. 3 and in vector register lanes depicted in FIG. 6). The input 326 shows how a part of the vector processor, such as the vector load-store unit, selects elements in vector register lanes in that the inputs for selection of the elements are from the outputted value of VAR register 322.

In some embodiments, a vector processor (e.g., vector processor 102 shown in FIGS. 1 and 2) can include a vector load-store unit (e.g., vector load-store unit 210 depicted in FIG. 2) and vector registers (e.g., vector registers 202). At least one of the registers can include a first vector register lane (e.g., first vector register lane 301 shown in FIG. 3) and a second vector register lane (e.g., vector register lane 303 shown in FIG. 3) for two lanes of a vector register. The vector processor can also include ALUs (e.g., ALUs 208). The ALUs can include ALUs for two or more vector registers (e.g., ALUs 304a and 304b).

An ALU for the vector registers can include a first lane input (e.g., input 308a) for an output communicated from either the first vector register lane or the second vector register lane of a first vector register. Another ALU for the vector registers can include a second lane input (e.g., input 312a) for an output communicated from either the first vector register lane or the second vector register lane of the first vector register. The ALU can further include an ALU output that is based on at least one function of the ALU and the first lane inputs of the first and second vector registers—e.g., see ALU output 314a.

The ALU for the vector registers can include a first lane input (e.g., input 308b) for an output communicated from either the first vector register lane or the second vector register lane of a second vector register. The ALU for the vector registers can also include a second lane input (e.g., input 312b) for an output communicated from either the first vector register lane or the second vector register lane of the second vector register. The ALU can further include an ALU output that is based on at least one function of the ALU and the second lane inputs of the first and second vector registers—e.g., see ALU output 314b.

In such embodiments, a bus (e.g., bus 206 depicted in FIG. 2) can be configured to communicatively couple the vector load-store unit, the vector registers, and the arithmetic logic units.

The bus can include a first 2:1 multiplexor (e.g., 2:1 multiplexor 309) configured to receive, as inputs (e.g., inputs 306a and 306b), an output from the first vector register lane and an output from second vector register lane. The first 2:1 multiplexor can also be configured to receive, as a selection input (e.g., selection input 324), a vector first register value (VFR value). The selection input for the first 2:1 multiplexor can be received from an output of a first scalar register (e.g., see scalar registers 313 which can be one of the scalar registers of scalar registers 204). The first 2:1 multiplexor can also be configured to select either the output from the first vector register lane or the output from second vector register lane based on the selection input, and communicate the selected output to the first lane input of the ALU 304a (e.g., input 308a).

The bus can include a second 2:1 multiplexor (e.g., 2:1 multiplexor 311) configured to receive, as inputs (e.g., inputs 310a and 310b), an output from the first vector register lane and an output from second vector register lane. The second 2:1 multiplexor can also be configured to receive, as a selection input (e.g., selection input 324), a VFR value. The selection input for the second 2:1 multiplexor can be received from an output of a scalar register (e.g., see scalar registers 313 which can be one of the scalar registers of scalar registers 204). The second 2:1 multiplexor can also be configured to select either the output from the first vector register lane or the output from second vector register lane based on the selection input, and communicate the selected output to the second lane input of the ALU 304b (e.g., see input 312a).

In some embodiments, the processor can include a vector load-store unit, at least one vector register having a first vector register lane and a second vector register lane, at least one programable scalar register, and first and second ALUs connected to the vector register and the programable scalar register so that values provided by the lanes of the vector register can be operated on by a value provided by the programable scalar register.

Also, in such embodiments, the first vector processor can include a vector first register (e.g., VFR) configured to provide the VFR value (e.g., VFR value 320) to the first and second 2:1 multiplexors to be used as a select input for the multiplexors. The second vector register (not depicted in FIG. 3) can include a VFR configured to provide a VFR value as well to multiplexors for the second vector register to be used as a select input.

Also, in such embodiments, the vector processor can include an index register (e.g., VAR register 322) for the first vector register lane, configured to provide an element address value (EA value)—e.g., see input 326. And, the index register can also be for the second vector register lane, configured to provide the EA value—e.g., see input 326.

In such embodiments, the vector processor can also include vector load-store unit that can be configured to determine, according to the VFR value and the EA value, a first initial address used to access the first vector register lane. The vector load-store unit can also be configured to determine, according to the VFR value and the element address value, a second initial address used to access the second vector register lane. In such embodiments, the ALU can be configured to access the first vector register lane according to the first initial address, and access the second vector register lane according to the second initial address.

In such embodiments, the vector load-store unit can be configured to increment the EA value as well as determine, according to the VFR value and the incremented element address value, a first next address used to access the first vector register lane, and determine, according to the VFR value and the incremented element address value, a second next address used to access the second vector register lane. The ALU can be configured to access the first vector register lane according to the first next address, and access the second vector register lane according to the second next address.

Also, in such examples, the vector load-store unit can be configured to repeat the incrementing of the first element address value and the second element address value. Accordingly, the vector load-store unit can be configured to change the VFR value, when the first element address value is equal to the number of elements in the first vector register lane (e.g., see input 326, which can include the EA value, and the number of vector elements 305a, 305b, 305c, and 305d), and change the VFR value, when the second element address value is equal to the number of elements in the second vector register lane (e.g., see input 326, which can include the EA value, and the number of vector elements 307a, 307b, 307c, and 307d).

In such examples, the vector load-store unit can also be configured to reset, in the first index, the first element address value, and reset, in the second index, the second element address value. The vector load-store unit can also be configured to determine, according to the changed VFR value and the reset element address value, a different first initial address used to access the second vector register lane. And, the vector load-store unit can also be configured to determine, according to the changed VFR value and the reset element address value, a different second initial address used to access the first vector register lane. The ALU can be configured to access the second vector register lane according to the different first initial address, and access the first vector register lane according to the different second initial address.

Also, the vector load-store unit can be configured to increment the reset first element address value and the reset second element address value. The vector load-store unit can also be configured to determine, according to the changed VFR value and the incremented element address value, a different first next address used to access the second vector register lane. And, the vector load-store unit can also be configured to determine, according to the changed VFR value and the incremented element address value, a different second next address used to access the first vector register lane. The ALU can be configured to access the second vector register lane according to the different first next address, and access the first vector register lane according to the different second next address.

In some embodiments, the vector processor can include a third vector register lane and a fourth vector register lane for two additional lanes of the first vector register such that the register includes four lanes (e.g., see vector register lanes 501*a*, 501*b*, 501*c*, and 501*d* illustrated in FIG. 6). Components for and working with the third and fourth vector register lanes can be analogous to the components for and working with the first and second vector register lanes described herein. E.g., see FIG. 6 for a depiction of a vector first system having four lanes instead of two lanes.

Figure 4:
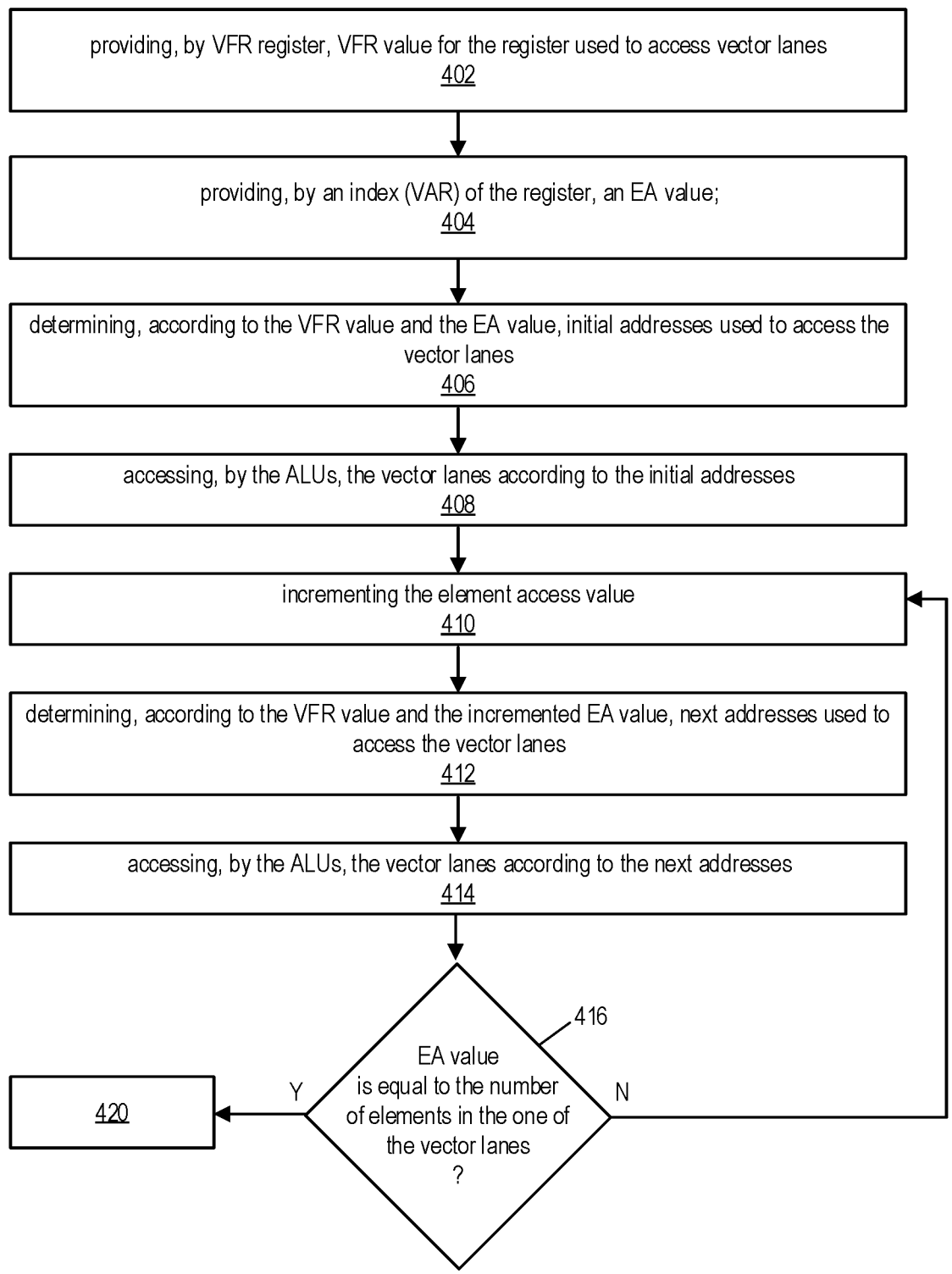
FIGS. 4 and 5 illustrate example operations of method 400, in accordance with some embodiments of the present disclosure.
Figure 5:
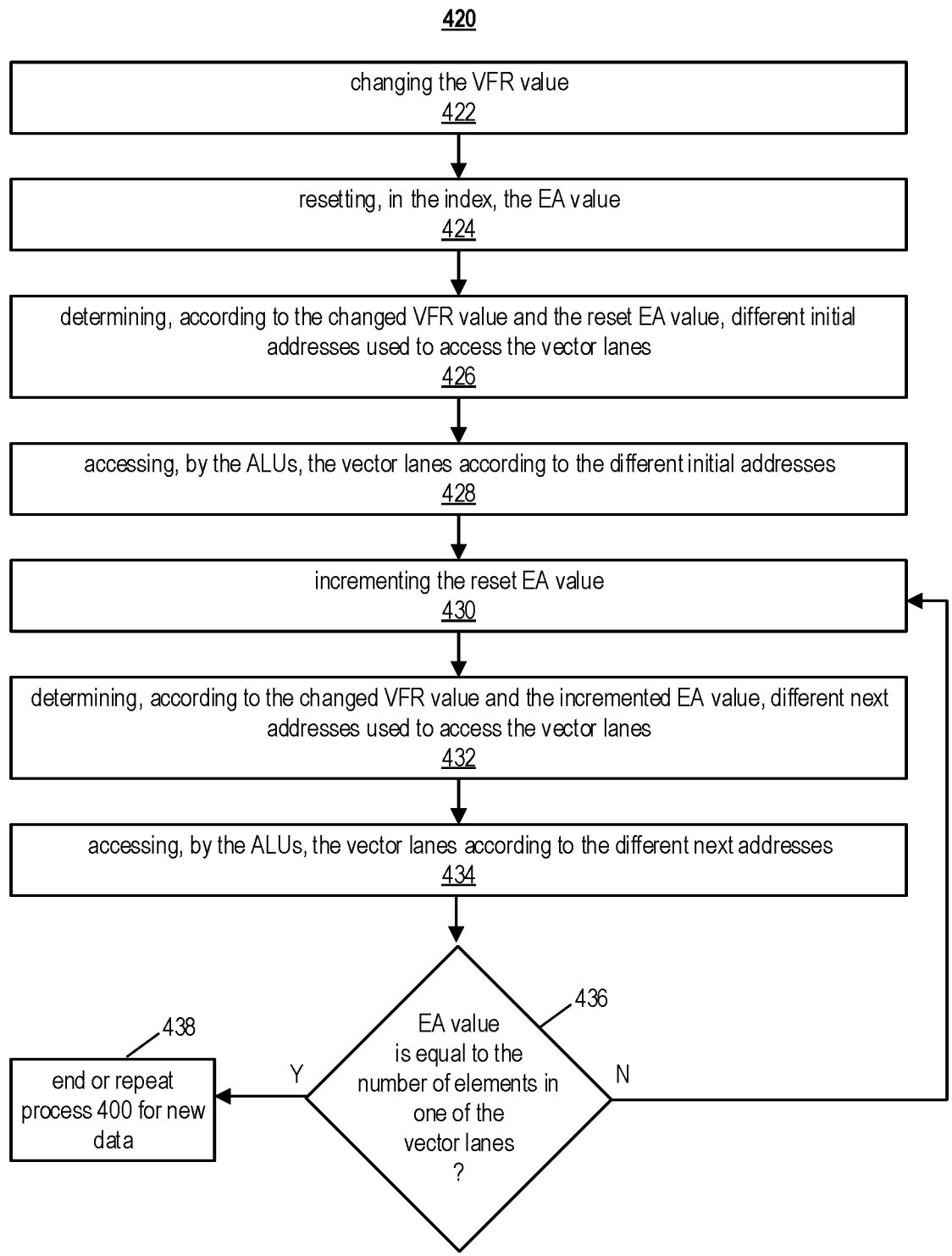

FIGS. 4 and 5 illustrate example operations of method 400, in accordance with some embodiments of the present disclosure. In some embodiments, a vector load-store unit, such as vector load-store unit 210, can perform or facilitate, solely or in combination with other parts of the vector processor, the operations of method 400. In some embodiments, the determinations, the incrementations, and changes to values describe herein can be performed by a vector load-store unit of the vector processor according to instructions stored in the vector load-store unit. In some other embodiments, other parts of the vector processor can perform or facilitate the operations of method 400 as well as other operations described herein.

In FIG. 4, the method 400 can be performed for a plurality of vector registers that provide inputs for a plurality of arithmetic logic units (ALUs). For example, the method 400 can be performed for first and second vector registers each providing input to ALUs of a vector processor. In such an example, each of the first and second vector registers can include multiple lanes, and the number of the lanes per register can be a power of two, and the number of ALUs receiving inputs from the registers equals the number of lanes. For example, step 402 or any of the other steps of method 400 can be performed for each vector register of the first and second vector registers of FIGS. 3 and 6.

In FIG. 4, the method 400 begins at step 402, with providing, by a vector first register (VFR) of a vector register having multiple lanes providing input to ALUs of a vector processor, a vector first register value (VFR value) used to access the vector lanes. The vector register being a register of a plurality of vector registers providing input to the ALUs. The VFR can include, for example, a VFR for a two-lane system (e.g., VFR 320 depicted in FIG. 3) or for a four-lane system (e.g., VFR 520 depicted in FIG. 6). The vector lanes can be provided by vector register lanes (e.g., vector register lanes 301 and 303 or 501*a*, 501*b*, 501*c*, and 501*d*). Each lane of the set of vector register lanes can be for an ALU in the vector processor (e.g., ALUs 304*a* and 304*b* or 504*a*, 504*b*, 504*c*, and 504*d*).

To put it another way, step 402 can include providing, by a VFR, a vector first register value (VFR value) used to access the lanes.

In some embodiments, the number of the respective vector lanes can be any power of two (e.g., two lanes, four lanes, sixteen lanes, etc.). For example, the number of the respective vector lanes can be four (e.g., see FIG. 6 where the vector first system 500 is for a multiple lane vector having four lanes). Also, the number of the respective vector lanes can be two (e.g., see FIG. 3 where the vector first system 300 is for a multiple lane vector having two lanes).

The respective vector register lanes and the data stored in the respective vector register lanes, including vector element values and metadata, can be included in one of the vector registers (e.g., see vector registers 202).

At step 404, the method 400 continues with providing, by an index for the vector register lanes (e.g., VAR registers 322 or 522 depicted in FIGS. 3 and 6 respectively), an element address value (EA value)—e.g., see the values "0", "1", "2", and "3" under "EA" shown in the vector register lanes depicted in FIGS. 3 and 6. The VFR value and the EA value can each be a scalar stored in scalar registers—such as registers in the scalar registers 204 shown in FIG. 2.

At step 406, the method 400 continues with determining, according to the VFR value and the EA value, initial addresses used to access the vector lanes. For examples of initial addresses see full addresses "Element_0_0" and "Element_1_0" in vector elements 305*a* and 307*a* depicted in FIG. 3 and in vector register lanes depicted in FIG. 6. Input 326 or 526 show how a part of the vector processor, such as the vector load-store unit, uses elements in vector register lanes in that the inputs for selection of the elements are from the outputted values of VAR register 322 or 522, in these examples.

At step 408, the method 400 continues with accessing, by the ALUs, the vector lanes according to the initial addresses. The accessing of the respective vector lanes according to the initial addresses can occur via multiplexors, such as 2:1 multiplexors 309 and 311 depicted in FIG. 3 or via 4:1 multiplexors 505*a*, 505*b*, 505*c*, and 505*d* depicted in FIG. 6. As shown in these drawings, there is a respective multiplexor for each lane. In some embodiments, the addresses are used to at least partially control the multiplexors and access to the vector lanes—e.g., the VFR value for each lane and an address can be used in combination to control the input select for the corresponding multiplexor and access to the vector lanes.

At step 410, the method 400 continues with incrementing the EA value (e.g., changing the VAR=0 to VAR=1).

At step 412, the method 400 continues with determining, according to the VFR value and the incremented EA value, next addresses used to access the vector lanes (e.g., see full addresses "Element_0_1" and "Element_1_1" in vector elements 305*b* and 307*b* depicted in FIG. 3 and in vector register lanes depicted in FIG. 6).

At step 414, the method 400 continues with accessing, by the ALUs (e.g., via 2:1 multiplexors 309 and 311 depicted in FIG. 3, or via 4:1 multiplexors 505*a*, 505*b*, 505*c*, and 505*d* depicted in FIG. 6), the vector lanes according to the next addresses. As mentioned, the addresses can be used to at least partially control the multiplexors and access to the vector lanes—e.g., the VFR value for each lane and an address can be used in combination to control the input select for the corresponding multiplexor and access to the vector lanes.

At step 416, the method 400 continues with determining whether the EA value is equal to the number of elements in one of the vector lanes. When a value of the EA value register is not equal to the number of elements in a vector lane of the vector lanes, then the method 400 continues with repeating the incrementing of the EA value at step 410 (e.g., changing the VAR=1 to VAR=2, and so on).

Otherwise, at step 422 in steps 420, illustrated in FIG. 5, the method includes changing the VFR value, when the EA value is equal to the number of elements in a vector lane of the vector lanes.

For example, if the EA value for first vector register lane 301 is "3", which references a fourth element, then the EA value is representatively equal to the four of elements in the lane; and thus, the VFR value for the first vector register lane 301 is changed at step 422. With such an example, in the case of there being two lanes, a value of "0" for a VFR of a lane can represent that an ALU is to access elements from that lane via its respective multiplexer, whereas a value of "1" for the VFR of the lane can represent that the ALU is to access elements from the other lane via its respective multiplexer. This example combination of operations and parameters can provide for the vector first processing in multiple lanes.

At step 424, the method 400 continues, in sub-steps 420 of FIG. 5, with resetting, in the index, the EA value. For example, a reset can include changing the EA value of a lane from "3" to "0" when there are four elements in a lane.

At step 426, the method 400 continues with determining, according to the changed VFR value and the reset EA value, different initial addresses used to access the vector lanes. For example, see full address "Element_0_0" in FIGS. 3 and 6, which can be used to access the initial element of a first of two lanes by an ALU input for the second of two lanes when the VFR value has changed, and see full address "Element_1_0" in FIGS. 3 and 6, which can be used to access the initial element of the second lane by ALU input for the first lane when the VFR value has changed.

At step 428, the method 400 continues with accessing, by the ALUs (e.g., via 2:1 multiplexors 309 and 311 depicted in FIG. 3, or via 4:1 multiplexors 505a, 505b, 505c, and 505d depicted in FIG. 6), the vector lanes according to the different initial addresses. In some embodiments, the addresses are used to at least partially control the multiplexors and access to the vector lanes—e.g., the VFR value for each lane and an address can be used in combination to control the input select for the corresponding multiplexor and access to the vector lanes.

At step 430, the method 400 continues with incrementing the reset EA value (e.g., changing the VAR=0 to VAR=1, changing the VAR=1 to VAR=2, and so on).

At step 432, the method 400 continues with determining, according to the changed VFR value and the incremented EA value, different next addresses used to access the respective vector lanes. For example, see full address "Element_0_1", which can be used to access the next element of the first of two lanes by an ALU input for the second of two lanes when the VFR value has changed, and see full address "Element_1_1" which can be used to access the next element of the second lane by ALU input for the first lane when the VFR value has changed.

At step 434, the method 400 continues with accessing, by the ALUs (e.g., via 2:1 multiplexors 309 and 311 depicted in FIG. 3, or via 4:1 multiplexors 505a, 505b, 505c, and 505d depicted in FIG. 6), the vector lanes according to the different next addresses. In some embodiments, the addresses are used to at least partially control the multiplexors and access to the vector lanes—e.g., the VFR value for each lane and an address can be used in combination to control the input select for the corresponding multiplexor and access to the vector lanes.

At step 436, the method 400 continues with determining whether the EA value is equal to the number of elements in one of the vector lanes. When the EA value is not equal to the number of elements in a vector lane of the vector lanes, then the method 400 continues with repeating the incrementing of the EA value at step 430 (e.g., changing the VAR=1 to VAR=2, and so on).

Otherwise, at step 438, the method 400 ends or includes changing the VFR value, when the EA value is equal to the number of elements in a vector lane of the vector lanes. Then, the method 400 can be repeated for new data.

As mentioned, the number of the respective vector lanes can be two (e.g., see FIG. 3 where the vector first system 300 is for a multiple lane vector having two lanes). In such examples, the providing of the VFR value can include providing, by a vector first register (VFR) of a vector register for a first vector lane for an arithmetic logic unit (ALU) of a vector processor, a VFR value used to access a first vector lane of a plurality of vector lanes for a first ALU. Also, in such examples, the providing of the VFR value can include providing the VFR value for a second vector lane for a second ALU, the VFR value used to access a second vector lane of the plurality of vector lanes.

Also, in the last-mentioned examples, the determining of the initial addresses can include determining, according to the VFR value and the element address value, a first initial address used to access the first vector lane. The determining of the initial addresses can also include determining, according to the VFR value and the element address value, a second initial address used to access the second vector lane. The accessing of the vector lanes according to the initial addresses can include accessing, by a first ALU of the ALUs, the first vector lane according to the first initial address. And, the accessing of the vector lanes according to the initial addresses can include accessing, by a second ALU of the ALUs, the second vector lane according to the second initial address.

Also, in the last-mentioned examples, the determining of the next addresses can include determining, according to the VFR value and the incremented element address value, a first next address used to access a vector lane of the plurality of vector lanes. The determining of the next addresses can also include determining, according to the VFR value and the incremented element address value, a second next address used to access a vector lane of the plurality of vector lanes. The accessing of the vector lanes according to the next addresses can include accessing, by the first ALU, the first vector lane according to the first next address. Also, in such examples, the accessing of the vector lanes according to the next addresses can include accessing, by the second ALU, the second vector lane according to the second next address.

Also, in the last-mentioned examples, the determining of the different initial addresses can include determining, according to the changed VFR value and the reset element address value, a different first initial address used to access the second vector lane. Also, the determining of the different respective initial addresses can include determining, according to the changed VFR value and the reset element address value, a different second initial address used to access the first vector lane. In such instances, the accessing the vector lanes according to the different initial addresses can include accessing, by the first ALU, the second vector lane according to the different first initial address. Such accessing of the vector lanes can also include accessing, by the second ALU, the first vector lane according to the different second initial address.

Also, in the last-mentioned examples, the determining of the different next addresses can include determining, according to the changed VFR value and the incremented element address value, a different first next address used to access the second vector lane. The determining of the different next addresses can also include determining, according to the changed VFR value and the incremented element address value, a different second next address used to access the first vector lane. In such instances, the accessing of the vector lanes according to the different next addresses can include accessing, by the first ALU, the second vector lane according to the different first next address. Also, such accessing of the respective vector lanes can include accessing, by the second ALU, the first vector lane according to the different second next address.

As mentioned, at least the determinations, the incrementations, and the changes to values described herein can be performed by a vector load-store unit of the vector processor according to instructions stored in the vector load-store unit.

Also, in some embodiments, the vector processor can include a third vector register lane and a fourth vector register lane for two additional lanes of the first vector register such that the register includes four lanes (e.g., see vector register lanes 501a, 501b, 501c, and 501d illustrated in FIG. 6). Components for and working with the third and fourth vector register lanes can be analogous to the components for and working with the first and second vector register lanes described herein.

FIG. 6 illustrates an example vector first system 500 having four lanes, in accordance with some embodiments of the present disclosure. The vector first system 500 is somewhat similar to the vector first system 300; however, the system 500 further incudes a third vector register lane and a fourth vector register lane for two additional lanes of the first vector register such that the register comprises four lanes (e.g., see vector register lanes 501a, 501b, 501c, and 501d).

In FIG. 6, the ALUs (e.g., ALUs 504a, 504b, 504c, and 504d) further include third lane inputs and fourth lane inputs of the first and second vector registers. The first lane input (e.g., lane input 507a) is for an output communicated from either the first, second, third, or fourth vector register lane of the first vector register. The second lane input (e.g., lane input 509a) is for an output communicated from either the first, second, third, or fourth vector register lane of the first vector register. The third lane input (e.g., lane input 511a) is for an output communicated from either the first, second, third, or fourth vector register lane of the first vector register. And, the fourth lane input (e.g., lane input 513a) is for an output communicated from either the first, second, third, or fourth vector register lane of the first vector register. To put it another way, the ALU has four lane inputs from the first vector register that can each receive information communicated from either the first, second, third, or fourth vector register lane. However, each of the four lane inputs is uniquely interfacing a respective output of a respective multiplexor belonging to a respective vector lane. In some embodiments, each of the ALUs include an ALU output that is based on at least one function of the ALU and the lane inputs of the same lanes of the first and second vector registers—e.g., see ALU outputs 514a, 514b, 514c, and 514d.

Also, the ALUs (e.g., ALUs 504a, 504b, 504c, and 504d) further include third lane inputs and fourth lane inputs for the first and second vector registers (parts of the second vector register are not shown except for its outputs which are lane inputs for the ALUs—e.g., see 507b, 509b, 511b, and 513b). A first lane input (e.g., lane input 507b) is for an output communicated from either the first, second, third, or fourth vector register lane of the second vector register. A second lane input (e.g., lane input 509b) is for an output communicated from either the first, second, third, or fourth vector register lane of the second vector register. A third lane input (e.g., lane input 511b) is for an output communicated from either the first, second, third, or fourth vector register lane of the second vector register. And, a fourth lane input (e.g., lane input 513b) is for an output communicated from either the first, second, third, or fourth vector register lane of the second vector register. To put it another way, the ALU has four lane inputs from the second vector register that can each receive information communicated from either the first, second, third, or fourth vector register lane. Similarly, each of the four lane inputs is uniquely interfacing a respective output of a respective multiplexor belonging to a respective vector lane. In some embodiments, each of the ALUs include an ALU output that is based on at least one function of the ALU and the lane inputs of the same lanes of the first and second vector registers—e.g., see ALU outputs 514a, 514b, 514c, and 514d.

As shown, with the vector first system 500, the first 2:1 multiplexor is replaced by a first 4:1 multiplexor 505a, and the second 2:1 multiplexor is replaced by a second 4:1 multiplexor 505b. The system 500 also includes a third 4:1 multiplexor 505c and a fourth 4:1 multiplexor 505d.

The first 4:1 multiplexor 505a can be configured to receive, as inputs (e.g., inputs 506), outputs from the first, second, third, and fourth vector register lanes. The first 4:1 multiplexor 505a can also be configured to receive, as a selection input (e.g., selection input 524a), the VFR value. In some examples, the selection input for the first 4:1 multiplexor is received from an output of a scalar register (e.g., a scalar register of scalar registers 515). The first 4:1 multiplexor 505a can also be configured to select either the output from the first, second, third, or fourth vector register lane based on the selection input, and to communicate the selected output to the first lane input of the ALU (e.g., see input 507a).

The second 4:1 multiplexor 505b can be configured to receive, as inputs (e.g., inputs 508), outputs from the first, second, third, and fourth vector register lanes. The second 4:1 multiplexor 505b can also be configured to receive, as a selection input (e.g., selection input 524b), the VFR value. In some examples, the selection input for the second 4:1 multiplexor is received from an output of a scalar register (e.g., a scalar register of scalar registers 515). The second 4:1 multiplexor 505b can also be configured to select either the output from the first, second, third, or fourth vector register lane based on the selection input, and to communicate the selected output to the second lane input of the ALU (e.g., see input 509a).

The third 4:1 multiplexor 505c can be configured to receive, as inputs (e.g., inputs 510), outputs from the first, second, third, and fourth vector register lanes. The third 4:1 multiplexor 505c can also be configured to receive, as a selection input (e.g., selection input 524c), the VFR value. In some examples, the selection input for the third 4:1 multiplexor is received from an output of a scalar register (e.g., a scalar register of scalar registers 515). The third 4:1 multiplexor 505c can also be configured to select either the output from the first, second, third, or fourth vector register lane based on the selection input, and to communicate the selected output to the third lane input of the ALU (e.g., see input 511a).

The fourth 4:1 multiplexor 505d is configured to receive, as inputs (e.g., inputs 512), outputs from the first, second, third, and fourth vector register lanes. The fourth 4:1 multiplexor 505d is also configured to receive, as a selection input (e.g., selection input 524d), the VFR value. In some examples, the selection input for the fourth 4:1 multiplexor is received from an output of a scalar register (e.g., a scalar register of scalar registers 515). The fourth 4:1 multiplexor 505d is also configured to select either the output from the first, second, third, or fourth vector register lane based on the selection input, and to communicate the selected output to the fourth lane input of the ALU (e.g., see input 513a).

Also, the scalar registers 515 can include programable scalar registers. A programable scalar register can be used so that a vector provided by a vector register (e.g., a vector register having lanes 501a, 501b, 501c, and 501d) can be operated on by a scalar provided by and programed into one of the programable scalar registers. For example, one of the operations can include a vector multiplied by a scalar value (e.g., vector A(i)×scalar p).

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be partially provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
    a first vector register configured to store a first vector having first data elements of a predetermined number, the first vector register having a first lane and a second lane;
    a second vector register configured to store a second vector having second data elements of the predetermined number, the second vector register having a third lane and a fourth lane;
    a third register configured to store an index;
    a plurality of arithmetic logic units;
    a first circuit coupled from the first vector register to a first arithmetic logic unit of the plurality of arithmetic logic units and a second arithmetic logic unit of the plurality of arithmetic logic units, the first circuit configured to provide a first lane input to the first arithmetic logic unit to generate a first output vector, the first circuit configured to provide a second lane input to the second arithmetic logic unit to generate a second output vector, the first lane input and the second lane input including data elements selected according to the index from the first vector, wherein the first circuit comprises:
        a first multiplexor configured to receive first vector elements from the first lane of the first vector and output the first lane input to the first arithmetic logic unit; and
        a second multiplexor configured to receive second vector elements from the second lane of the first vector and output the second lane input to the second arithmetic logic unit; and
    a second circuit coupled from the second vector register to a third arithmetic logic unit of the plurality of arithmetic logic units, the second circuit further configured to provide a third lane input to the first arithmetic logic unit and a fourth lane input to the second arithmetic logic unit, the third lane input and the fourth lane input including data elements selected according to the index from the second vector.

2. The apparatus of claim 1, wherein the first lane input has a predetermined number of data elements, including a first portion selected from the first vector and a second portion selected from the second vector.

3. The apparatus of claim 2, wherein in the first lane input the second portion follows the first portion as a vector input to the first arithmetic logic unit.

4. The apparatus of claim 3, wherein in the first vector register the first portion starts at the index; and in the second vector register the second portion ends before the index.

5. The apparatus of claim 4, wherein the first circuit includes the first multiplexor configured to select the first portion and the second portion from the first vector register and the second vector register to form the first lane input as the vector input to the first arithmetic logic unit.

6. The apparatus of claim 5, wherein the apparatus further comprises:
a fourth vector register configured to store a fourth vector having fourth data elements of the predetermined number; and
wherein the second circuit or the first circuit is further configured to couple the second vector register and the fourth vector register to the second arithmetic logic unit, the second circuit or the first circuit including a third multiplexor configured to select data elements according to the index from the second vector register and the fourth vector register to provide a fifth vector as a vector input to the second arithmetic logic unit.

7. The apparatus of claim 6, wherein the fifth vector has a predetermined number of fifth data elements, including a third portion selected from the second vector register and a fourth portion selected from the fourth vector register.

8. The apparatus of claim 7, wherein in the fifth vector the fourth portion follows the third portion as the vector input to the second arithmetic logic unit; in the second vector register the third portion starts at the index; and in the fourth vector register the fourth portion ends before the index; the second portion and the third portion are non-overlapping portions in the second vector register; and the second portion and the third portion provide the second data elements stored in the second vector register.

9. The apparatus of claim 8, wherein the first arithmetic logic unit and the second arithmetic logic unit process the first lane input and the fourth vector respectively in parallel.

10. The apparatus of claim 5, wherein the apparatus further comprises:
a fourth vector register configured to store a fourth vector having fourth data elements of the predetermined number; and
wherein the second circuit or the first circuit is further configured to couple the fourth vector register and the first vector register to the second arithmetic logic unit, the second circuit or the first circuit including a third multiplexor configured to select data elements according to the index from the fourth vector register and the first vector register to provide a fifth vector as a vector input to the second arithmetic logic unit.

11. The apparatus of claim 10, wherein the fifth vector has a predetermined number of fifth data elements, including a third portion selected from the fourth vector register and a fourth portion selected from the first vector register.

12. The apparatus of claim 11, wherein in the fifth vector the fourth portion follows the third portion as the vector input to the second arithmetic logic unit; in the fourth vector register the third portion starts at the index; and in the first vector register the fourth portion ends before the index.

13. The apparatus of claim 12, wherein the first portion and the fourth portion are non-overlapping portions in the first vector register; the first portion and the fourth portion provide the first data elements stored in the first vector register; and the first arithmetic logic unit and the second arithmetic logic unit process the first lane input and the fifth vector respectively in parallel.

14. The apparatus of claim 5, wherein the apparatus further comprises:
a second arithmetic logic unit, wherein the second circuit or the first circuit is further configured to couple the second vector register and the first vector register to the second arithmetic logic unit, the second circuit or the first circuit including a third multiplexor configured to select data elements according to the index from the second vector register and the first vector register to provide a fourth vector as a vector input to the second arithmetic logic unit, the first arithmetic logic unit and the second arithmetic logic unit configured to process the first lane input and the fourth vector respectively in parallel.

15. An apparatus, comprising:
a plurality of vector registers configured to store a plurality of vectors of data elements respectively;
a register configured to store an index;
a plurality of processing units configured to operate in parallel; and
a circuit controlled by the register and coupled between the plurality of vector registers and the plurality of processing units, the circuit configured to provide a plurality of input vectors to the plurality of processing units respectively, wherein the circuit is configured to generate each respective input vector in the plurality of input vectors using:
a first portion selected according to the index from a first lane and a second lane of a first vector register in the plurality of vector registers; and
a second portion selected according to the index from a third lane and a fourth lane of a second vector register in the plurality of vector registers,
wherein the circuit comprises:
a first multiplexor configured to receive first data from the first lane of the first vector register and second data from the second lane of the first vector register and output a first lane input to a first processing unit of the plurality of processing units;
a second multiplexor configured to receive third data from the first lane of the first vector register and fourth data from the second lane of the first vector register and output a second lane input to a second processing unit of the plurality of processing units;
a third lane input to the first processing unit from a third multiplexor associated with the third lane of the second vector register, wherein the third multiplexor further outputs the third lane input to a third processing unit of the plurality of processing units; and
a fourth lane input to the second processing unit from a fourth multiplexor associated with the fourth lane of the second vector register.

16. The apparatus of claim 15, wherein each vector of data elements stored in a respective vector register in the plurality of vector registers has two portions identified by the index; and the circuit is configured to provide the two portions respective in two different input vectors in the plurality of input vectors.

17. The apparatus of claim 16, wherein the circuit includes a plurality of multiplexors configured to provide the plurality of input vectors to the plurality of processing units respectively in parallel.

18. A method, comprising:
storing, into a plurality of vector registers, a plurality of vectors of data elements respectively;
storing, into a register, an index;
generating, using a circuit controlled by the register and coupled between the plurality of vector registers and a plurality of processing units, a plurality of input vectors to the plurality of processing units respectively, wherein each respective input vector in the plurality of input vectors includes:

a first portion selected according to the index from a first lane and a second lane of a first vector register in the plurality of vector registers; and a second portion selected according to the index from a third lane and a fourth lane of a second vector register in the plurality of vector registers, wherein the circuit comprises:

a first multiplexor configured to receive first data from the first lane of the first vector register and second data from the second lane of the first vector register and output a first lane input into a first processing unit of the plurality of processing units;

a second multiplexor configured to receive third data from the first lane of the first vector register and fourth data from the second lane of the first vector register and output a second lane input to a second processing unit of the plurality of processing units;

a third lane input to the first processing unit from a third multiplexor associated with the third lane of the second vector register, wherein the third multiplexor further outputs the third lane input to a third processing unit of the plurality of processing units; and a fourth lane input to the second processing unit from a fourth multiplexor associated with the fourth lane of the second vector register; and processing, by the plurality of processing units, the plurality of input vectors in parallel.

19. The method of claim 18, wherein the generating comprises:

selecting, using a plurality of multiplexors in the circuit and according to the index, data elements from the plurality of vector registers to generate the plurality of input vectors respectively in parallel.

20. The method of claim 18, wherein the generating comprises:

retrieving a plurality of data elements from the plurality of vector registers respectively in parallel; and directing, using a plurality of multiplexors in the circuit and according to the index, the plurality of data elements to the plurality of processing units respectively in parallel.

* * * * *